(12) United States Patent
Orsulak et al.

(10) Patent No.: US 8,478,455 B2
(45) Date of Patent: Jul. 2, 2013

(54) VEHICLE CONTROL STATION WITH BACK-UP VSM FOR REMOTELY CONTROLLING AN UNMANNED VEHICLE, AND METHOD

(75) Inventors: Jane M. Orsulak, Nokesville, VA (US); Jason J. Rubin, Tucson, AZ (US); Christopher J. Graham, Bethesda, MD (US)

(73) Assignee: Raytheon Company, Waltham, MA (US)

( * ) Notice: Subject to any disclaimer, the term of this patent is extended or adjusted under 35 U.S.C. 154(b) by 434 days.

(21) Appl. No.: 12/752,703

(22) Filed: Apr. 1, 2010

(65) Prior Publication Data
US 2011/0245996 A1    Oct. 6, 2011

(51) Int. Cl.
*G05D 1/00* (2006.01)
(52) U.S. Cl.
USPC .......................................................... 701/2
(58) Field of Classification Search
USPC .......................................................... 701/2
See application file for complete search history.

(56) References Cited

U.S. PATENT DOCUMENTS

| 2005/0103932 A1 | 5/2005 | Huynh |
| 2006/0106506 A1 | 5/2006 | Nichols et al. |
| 2008/0018525 A1 | 1/2008 | Svy et al. |
| 2008/0056123 A1 | 3/2008 | Howard et al. |
| 2008/0065401 A1 | 3/2008 | Abrahamson |
| 2009/0216390 A1* | 8/2009 | Smith et al. ........................ 701/2 |
| 2010/0017049 A1* | 1/2010 | Swearingen et al. ............. 701/3 |
| 2010/0070124 A1 | 3/2010 | Yeager et al. |
| 2010/0318475 A1 | 12/2010 | Abrahamson |

OTHER PUBLICATIONS

Notification Concerning Transmittal of International Preliminary Report on Patentability dated Oct. 11, 2012 for corresponding Application No. PCT/US2011/020296.

* cited by examiner

*Primary Examiner* — Thomas Tarcza
*Assistant Examiner* — Maceeh Anwari
(74) *Attorney, Agent, or Firm* — Cantor Colburn LLP (57) ABSTRACT

According to one embodiment, a control station having a station processing system, a control system, a data link computing unit, a second data link and a back-up VSM (a second vehicle computing unit) is operable to communicate via an RF link with an unmanned vehicle having a first data link, a vehicle processing system, a first vehicle computing unit and a route control system. The control station being operable to communicate with the unmanned vehicle using a first protocol for messaging under normal operating conditions as well as through the use of a second protocol for messaging, initiated via the second vehicle computing unit, when either the vehicle processing system is inoperable, the vehicle computing unit is inoperable or when the second vehicle computing unit in the control station is directed to use the second protocol for messaging.

20 Claims, 5 Drawing Sheets

VEHICLE CONTROL STATION WITH BACK-UP VSM FOR REMOTELY CONTROLLING AN UNMANNED VEHICLE, AND METHOD

TECHNICAL FIELD OF THE DISCLOSURE

This disclosure relates to unmanned vehicle systems. More particularly, this disclosure relates to a vehicle control station having a backup vehicle specific module (VSM) for remotely controlling an unmanned vehicle, and a method of operating the same.

BACKGROUND OF THE DISCLOSURE

Unmanned vehicles generally refer to a type of vehicle that operates without an onboard pilot or driver. Various types of unmanned vehicles have been designed for various purposes and may include, for example, aircraft that travel through air, land-based vehicles that travel over the surface of the ground, and boats that travel over the surface of the water. These unmanned vehicles may be used to accomplish tasks that may generally be too dangerous or impractical for direct human involvement. For example, unmanned vehicles may be used in military missions for reconnaissance of enemy forces over enemy lines to avoid deployment of military personnel in harm's way. Unmanned vehicles may also be used in harsh environments, such as chemically contaminated areas, at high altitudes or in other hazardous environments that may be generally unsuitable for human habitation. Control of unmanned vehicles is typically provided by a vehicle control system that communicates with one or more unmanned vehicles using a wireless radio frequency (RF) communication link. The RF communication link allows these vehicle control systems to maintain operable communication with the unmanned vehicles and thereby maintain positive route control or flight control throughout the course of the missions.

In the past, control of many unmanned vehicles involved sending command and control messages from the vehicle control system to the unmanned vehicle in a proprietary protocol that, in turn, were communicated directly to a route or flight control system. The proprietary protocol is typically specific to the individual unmanned vehicle or a payload disposed onboard the unmanned vehicle and provided by the manufacturer of such. This presented a problem in the industry by creating interoperability issues between the various vehicle control stations and various unmanned vehicles available in the industry.

The solution to minimize inoperability was to design the unmanned vehicles to be able to receive command and control messages in a common format or standardized protocol so that the various available vehicle control stations would be interoperable with the unmanned vehicles. In the course of addressing this need, many unmanned vehicles are now designed today with a vehicle processing system placed on-board the unmanned vehicle that is coupled to, or includes within it, a vehicle computing unit for converting the command and control messages from the common standardized protocol into the proprietary protocol suitable for communication to a route control or flight control system on the unmanned vehicle. In this manner, various vehicle control stations that implement the standardized protocol for constructing messages could be used for communicating with the various unmanned vehicles no matter what proprietary protocols are required internally onboard the unmanned vehicles. However, in placing the vehicle computing unit on-board the unmanned vehicle, there now arises the potential for a failure of either of the vehicle processing system or the vehicle computing unit to result in a complete loss of control of the unmanned vehicle. Hence, there is a strong heartfelt need for alleviating this potential loss of control of the unmanned vehicle now presented in many of today's current unmanned vehicle designs that make use of an on-board vehicle computing unit.

SUMMARY OF THE DISCLOSURE

According to one embodiment of the present disclosure, a control station is operable to communicate via a data link to sending RF signals carrying command and control messages. The command and control messages are received by a data link located on-board the unmanned vehicle (hereinafter first data link) and processed by the unmanned vehicle's on-board vehicle computing unit (hereinafter first vehicle computing unit). Further, according to one embodiment of the present disclosure, the control station includes a control system, a data link computing unit, a second data link and a second vehicle computing unit. The control system is in communication with both the data link computing unit and the second vehicle computing unit and is operable to receive input for controlling the unmanned vehicle, formulating command and control messages using a proprietary or standard protocol and then sending out the command and control messages to ultimately be acted upon by the unmanned vehicle. Within the control station, the data link computing unit acts upon the data link messages received from the control system then sends configuration instructions to the second data link to set up its operational configuration (e.g., transmit/receive frequencies, antenna positioning, etc.). The second vehicle computing unit within the control station serves as a backup system for controlling the unmanned vehicle's route (or flight, in the case of an aerial unmanned vehicle) when the unmanned vehicle's processing system becomes inoperable or has a negative health.

The control station's second vehicle computing unit provides its backup capability by being able to convert the vehicle command and control messages received from the control system into the requisite unmanned vehicle's proprietary messaging protocol and transmitting them to the vehicle's route control system. That is, the vehicle messages would now not first be required to be processed by the first vehicle computing unit and vehicle processing system on-board the unmanned vehicle, which is now inoperable for purposes of its intended tasks as indicated by its negative health status, before being sent to the route control system. The second vehicle computing unit in the control station is also operable to receive the vehicle messages from the control system in the standardized protocol and simply pass them through to the second data link for transmission out to the unmanned vehicle when the unmanned vehicle's processing system is operating properly (e.g., a positive health).

Accordingly, some embodiments of the disclosure may provide numerous technical advantages. Some embodiments may benefit from some, none or all of these advantages. For example, a technical advantage of one embodiment of the disclosure may be improved continual control over the unmanned vehicle during a failure of the vehicle processing system or a failure of the first vehicle computing unit located on-board the unmanned vehicle. Many unmanned vehicles are configured with the first vehicle computing unit being the single means to provide instructions to the route control system via the vehicle processing system, wherein a single failure of either of such could result in loss of control of the unmanned vehicle. The control station of the present invention alleviates this potential loss of control.

Although specific advantages have been disclosed hereinabove, it will be understood that various embodiments may include all, some, or none of the disclosed advantages. Additionally, other technical advantages not specifically cited may become apparent to one of ordinary skill in the art following review of the ensuing drawings and their associated detailed description. The foregoing has outlined rather broadly some of the more pertinent and important advantages of the present disclosure in order that the detailed description of the disclosure that follows may be better understood so that the present contribution to the art can be more fully appreciated. It should be appreciated by those skilled in the art that the conception and the specific embodiment disclosed may be readily utilized as a basis for modifying or designing other structures for carrying out the same purposes of the present disclosure. It should also be realized by those skilled in the art that such equivalent constructions do not depart from the spirit and scope of the present disclosure as set forth in the appended claims.

BRIEF DESCRIPTION OF THE DRAWINGS

For a fuller understanding of the nature and possible advantages of embodiments of the disclosure, reference should be had to the detailed description taken in conjunction with the accompanying drawings in which:

FIG. 4, consisting of FIGS. 4A-4B, are flowcharts showing one embodiment of a series of actions that may be performed by the second vehicle computing unit within the control station of FIG. 1;

Similar reference characters refer to similar parts throughout the several views of the drawings.

DETAILED DESCRIPTION OF EXAMPLE EMBODIMENTS

Control of unmanned vehicles may be facilitated by unmanned vehicle control stations that communicate with unmanned vehicles using a wireless communication link. To promote standardization of various types of unmanned vehicles, a number of unmanned vehicle messaging protocols have been established. The Joint Architecture for Unmanned Systems (JAUS) was one of the first messaging protocols to be implemented for use with unmanned vehicles by the United States Department of Defense. The JAUS specification operates in a manner to provide a generally hierarchical system of subsystems, nodes, and components that define various aspects of an unmanned vehicle network. Another messaging protocol that has gained wide spread use in recent years is known as the STANdardization AGreement (STANAG) 4586 format protocol implemented for use with unmanned vehicles. The STANdardization AGreement 4586 specification, which defines its associated messaging protocol, has been written by member nations of the North Atlantic Treaty Organization (NATO) for the purpose of encouraging interoperability of unmanned vehicles among each member nation. Thus, unmanned vehicles having a STANdardization AGreement 4586 compliant interface may be coordinated with those of other member nations using a common control system. These two differing standardized messaging protocols have been and are being used for the communication of unmanned vehicle control stations with various types of unmanned vehicles. However, these two standardized messaging protocols are very different from one another and are not interoperable with each other.

In addition to the varying messaging protocols being used today, there are many types of unmanned vehicles in use today. It is typical for each unmanned vehicle to have a processing system on board and a route control system or, in the case of an aerial vehicle, a flight control system, for eventually receiving command and control (also referred to as "C2") messages directing its operation. Typically the route control system communicates through messages utilizing a proprietary protocol that is unique to the individual unmanned vehicle. As such, a vehicle specific module unique to the unmanned vehicle is utilized to communicate to the route control system and provide the command and control instructions in such unique protocol. The vehicle specific module is typically designed to be able to receive messages in one of the above mentioned standardized protocols and then subsequently convert the messages into the unique protocol for subsequent communication to the route control system. In an effort to make the many differing unmanned vehicle control stations that are available in the industry today interoperable with the various unmanned vehicles, the vehicle specific module has been placed onboard the unmanned vehicle. Communication from the control station to the unmanned vehicle is then accomplished through use of messages utilizing one of the above mentioned standardized protocols.

However, by virtue of having the vehicle specific module placed onboard the unmanned vehicle and communicating from the control station to the unmanned vehicle by way of the STANAG 4586 protocol, there is the potential to lose control of the unmanned vehicle in the event either of the vehicle processing system or the vehicle specific module malfunctions. Hence, in the effort to enhance interoperability between the unmanned vehicle control stations and the many varying unmanned vehicles, there has arisen a problem with maintaining control of the unmanned vehicle in the event of such a processing system failure or a failure of the vehicle specific module.

Figure 1:
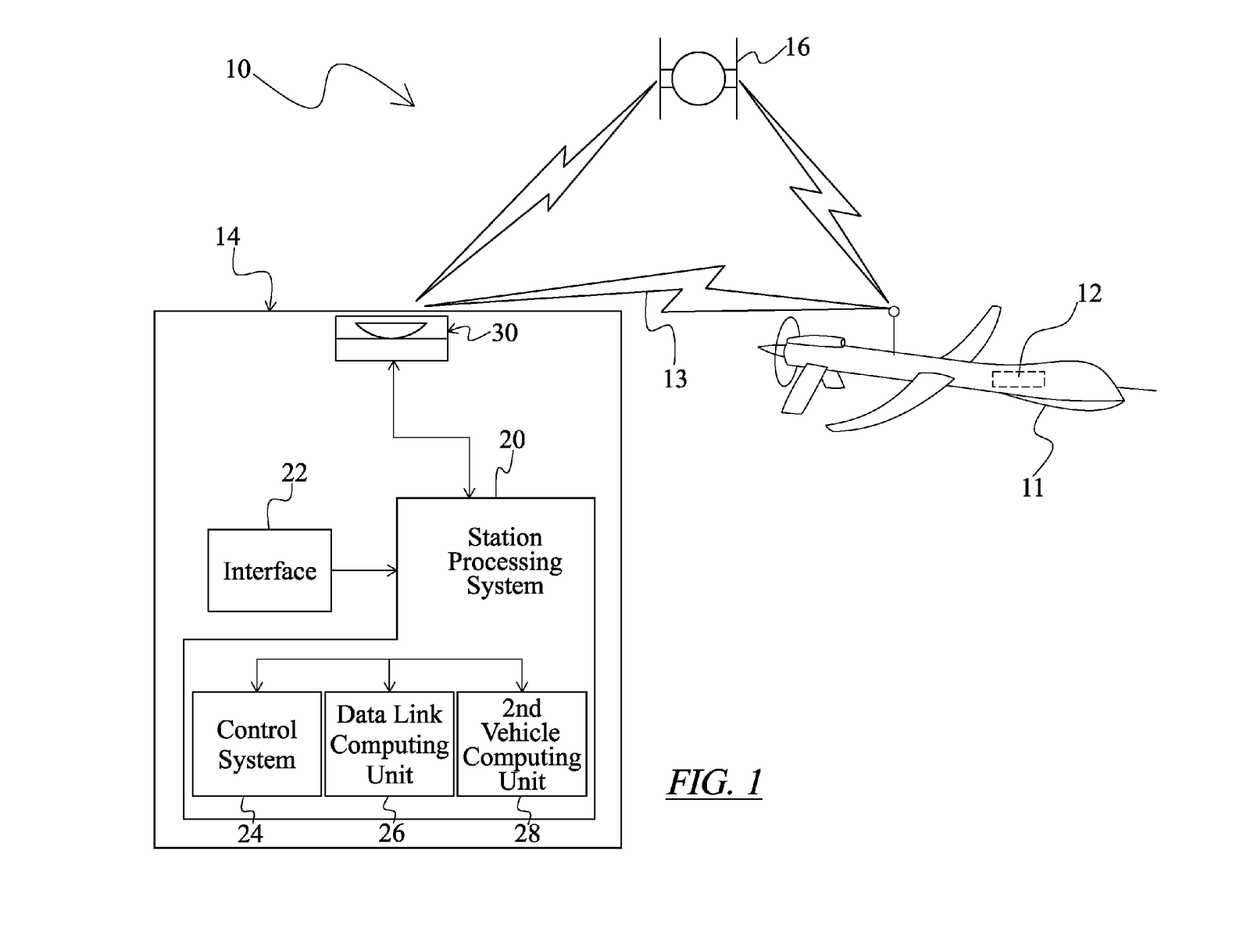
FIG. 1 is a diagram of an unmanned vehicle system within which one embodiment of a control station with back-up VSM may be implemented in accordance with the teachings of the present disclosure.

FIG. 1 shows an unmanned vehicle system 10 comprised of an unmanned vehicle 11 having an electronics system 12 in communication via a wireless link 13 with one embodiment of a control station 14 that may provide a solution to this undesired problem as well as other problems. FIG. 1 illustrates unmanned vehicle 11 as an aerial vehicle in the form of an airplane. However, it should be understood that unmanned vehicle 11 may be in the form of any number of various unmanned vehicles, for example, aircraft that travel through air, land-based vehicles that travel over the surface of the ground, and boats that travel over or under the surface of the water. FIG. 1 also illustrates the use of a satellite 16 that may be utilized to facilitate completing the wireless link 13. The wireless link 13 is preferably in the form of a radio frequency (RF) link commonly used in the industry and typically suitable for use in transmitting and receiving electronic messages. The electronics system 12 onboard the unmanned vehicle 11 further includes a vehicle processing system 18 (see FIG. 2) for facilitating processing command and control messages received from the control station 14. Vehicle processing system 18 may be any suitable type of computing system implemented with a processor executing computer instructions stored in a memory.

In one embodiment, control station 14 generally includes a station processing system 20 having an interface 22 coupled thereto facilitating the input and receipt of command and control instructions to and from the unmanned vehicle 11. Interface 22 may be in the form of one or more user input devices for controlling the unmanned vehicle 11 and/or submitting requests for information from the unmanned vehicle 11. Interface 22 may be any suitable input device for entry of information to the station processing system 20, such as a keyboard, a pointing device, a mouse, and/or one or more joysticks. Station processing system 20 may be any suitable type of computing system implemented with a processor executing computer instructions stored in a memory. In one embodiment, coupled to station processing system 20 is a control system 24, a data link computing unit 26, a second vehicle computing unit 28 and a second data link 30.

In this particular embodiment, control system 24 is in the form of a core unmanned aerial vehicle control system (CUCS) operating to communicate with the second vehicle computing unit 28 and the data link computing unit 26 using the STANAG 4586 messaging protocol. The data link computing unit 26 is preferably in the form of a data link specific module (also known as a Data Link VSM) uniquely adapted to receive data link command and control messages in the STANAG 4586 protocol from the control system 24 and then convert and communicate such messages in a data link proprietary protocol to the second data link 30 to configure its operation with respect to, for example, operating frequency, antenna positioning and other aspects that are typically necessary for standard messaging setup for data links in general. The second vehicle computing unit 28 is preferably in the form of a vehicle specific module (VSM) that is uniquely adapted to receive vehicle command and control messages in the STANAG 4586 protocol from the control system 24 and either pass such messages through to the second data link 30 or to convert such messages into the vehicle proprietary messaging protocol for subsequent communication to the unmanned vehicle 11.

In one embodiment, the data link computing unit 26 and the second vehicle computing unit 28 are preferably comprised of individual software programs residing in the memory of the station processing system 20. Alternatively, they may be stand-alone systems, each of which having its own processing system and being in communication with the control system 24. The second data link 30 in the particular embodiment of the present disclosure is generally comprised of an antenna and various transmit/receive electronics that are commonly available in the industry and suitable for unmanned vehicle applications. Further, in another embodiment, the data link computing unit 26 may be combined and integral with the second data link 30 as a single unit having its own processing capability and configured to receive data link command and control messages in the STANAG 4586 protocol directly from the control system 24. The interoperability of the components of the control station 14 with the components of the unmanned vehicle 11 may be more fully understood by now referring to FIG. 2.

Figure 2:
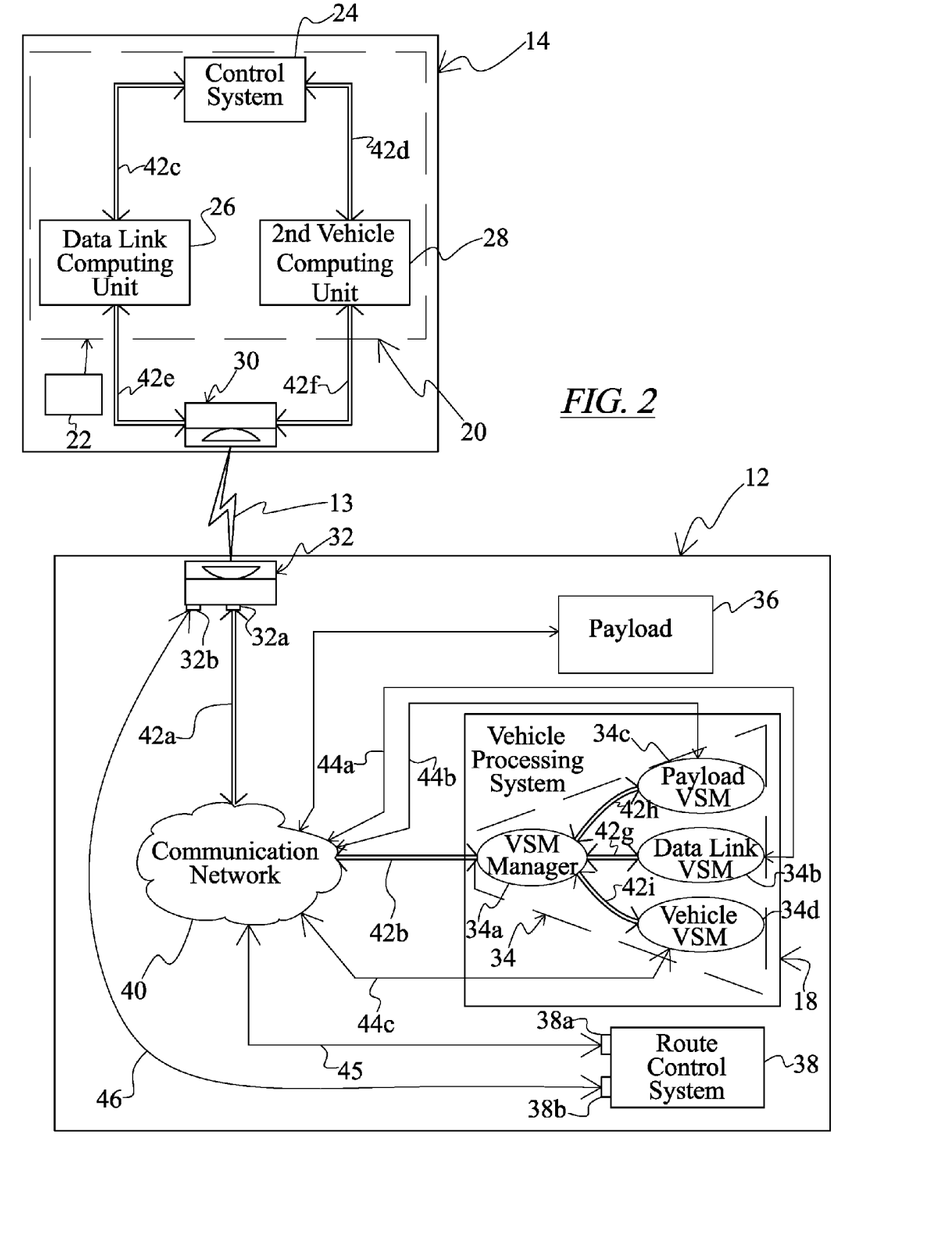
FIG. 2 is a detailed block diagram illustrating the elements and the operational flow within the control station and unmanned vehicle of FIG. 1 in accordance with the teachings of the present disclosure.

In FIG. 2, a detailed block diagram is provided illustrating the elements and the operational flow of communication among the elements within the control station 14 and the unmanned vehicle 11 of FIG. 1 in accordance with the teachings of the present disclosure. The electronic system 12 of the unmanned vehicle 11 can also be seen in greater detail showing its individual components. At a high level, the electronic system 12, according to the teachings of the present disclosure, is comprised of a first data link 32 having a network port 32a and a serial port 32b, a first vehicle computing unit 34 contained within the vehicle processing system 18, a payload 36, and a route control system 38 having a network port 38a and a serial port 38b, all functionally coupled to a communication network 40 via standard network connections. In one embodiment, the communication network 40 may be implemented in the form of an Ethernet router. In other embodiments, the communication network 40 may be implemented in the form of various other network switches commonly used and/or generally known in the communications industry for achieving interconnectivity among multiple devices.

The first data link 32 and the route control system 38 are particularly coupled to the communication network 40 via their respective network ports 32a and 38a. The standard network connections may be in the form of Ethernet, network TCP/IP running on top of Ethernet or any other suitable form of networking connection commonly used and/or generally available in the industry. More particularly, the first data link 32 is coupled via its network port 32a to the communication network 40 via DLI connection 42a through which Data Link Interface (DLI) protocol messaging traffic is facilitated. The first data link 32 is generally comprised of an antenna and various transmit/receive electronics that are commonly available in the industry and suitable for unmanned vehicle applications.

In a similar fashion, the first vehicle computing unit 34 is coupled to the communication network 40 via DLI connection 42b through which DLI protocol messaging traffic is facilitated. The first vehicle computing unit 34 is operable to receive command and control messages sent from the control station 14 in the STANAG 4586 messaging protocol, convert such messages into the specific proprietary protocols of the payload 36, first data link 32 and route control system 38, and transmit such thereto for further processing. The control system 24 in the control station 14 is coupled to the data link computing unit 26 and the second vehicle computing unit 28 via respective DLI connections 42c and 42d through which DLI protocol messaging traffic is facilitated. Further, data link computing unit 26 is coupled to the second data link 30 and second vehicle computing unit 28 is coupled to the second data link 30 via respective DLI connections 42e and 42f through each of which DLI protocol messaging traffic is facilitated.

In one embodiment, the first vehicle computing unit 34 may further be comprised of a vehicle specific module manager (VSM manager) 34a that is further coupled to a data link vehicle specific module (data link VSM) 34b, a payload vehicle specific module (payload VSM) 34c and a vehicle VSM 34d via respective DLI connections 42g, 42h and 42i through which DLI protocol messaging traffic is facilitated. The outputs of the data link VSM 34b, payload VSM 34c and vehicle VSM 34d are all coupled via standard network connections, 44a, 44b and 44c respectively, to the communication network 40. Payload 36 is coupled to the communication network 40 via standard network connection 44d. The standard network connections may be in the form of Ethernet, network TCP/IP running on top of Ethernet or any other suitable form of networking connection commonly used and/or generally available in the industry. The DLI connections 42a-42i are communication paths typically carrying messages formed pursuant to the STANAG 4586 protocol guidelines which are vehicle and payload protocol independent. However, such communication paths are also capable of handling message traffic using other various protocols. DLI connections 42a, 42b and 42g-42i are the primary communication paths in the electronics system 12 within the unmanned vehicle 11 carrying the various STANAG 4586 command and control messages from the first data link 32 to the communication network 40 and then to the vehicle processing system 18 and first vehicle computing unit 34. From the vehicle computing unit 34, the messages are ultimately disbursed to the data link, payload and vehicle VSMs, 34b, 34c and 34d respectively, for translation into the specific message protocols required for successful communication to respective first data link 32, payload 36 and route control system 38.

In one embodiment, the first vehicle computing unit 34 and its VSM manager 34a, data link VSM 34b, payload VSM 34c and vehicle VSM 34d may all be in the form of individual software programs residing in the memory of the vehicle processing system 18. Alternatively, other embodiments may implement all or some of the VSMs 34a, 34b, 34c and 34d as stand-alone systems, each of which having a processor capable of executing computer instructions stored in a memory and being coupled to the vehicle processing system 18. The route control system 38 is preferably in the form of a stand-alone system having a processor capable of executing computer instructions stored in a memory. For example, the route control system 38 may be in the form of various standard hardware and software commonly used and/or generally known in the industry to provide standard autopilot functionality utilizing GPS and inertial data. Alternatively, other embodiments may implement the route control system 38 as an individual software program residing in the memory of the vehicle processing system 18 and adapted for performing standard autopilot functionality. Further, in accordance with the teachings of the present disclosure, the route control system 38 is, in addition to being coupled to the communication network 40 via a standard network connection 45, also coupled to the serial port 32b of the first data link 32 via serial connection 46.

In accordance with teachings of the present disclosure, the route control system 38 is operable to receive command and control messages presented in its proprietary messaging protocol through either of its network connection 45 or serial connection 46. In normal operating mode the route control system 38 receives its command and control messages via its network connection 45. However, when the vehicle processing system 18 is not operating properly or otherwise may have a negative health, as may be reported or indicated by way of a heartbeat message monitored by the control station 14, the route control system 38 looks to receive its command and control messages through its serial connection 46. The vehicle processing system 18 and the first vehicle computing unit 34 are operable to transmit a heartbeat message at periodic intervals in conjunction with the regular receipt and transmission of command and control messages during normal operation. In one embodiment, the heartbeat message is ultimately transmitted back via the communication network 40 and respective first and second data links 32 and 30 to the second vehicle computing unit 28 and control system 24 in the control station 14. When the heartbeat message is not received on time or otherwise indicates a negative health, the control station 14 switches to a back-up mode of operation thereby communicating with the route control system 38 in the unmanned vehicle 11 using a second protocol for the command and control messages and whereby the vehicle processing system 18 is not used.

The heartbeat message in accordance with the present disclosure is comprised preferably of a rather simplified message having no data fields as defined in the STANAG 4586 standards specification which calls simply for a presence vector and a time stamp. The heartbeat's periodic rate is preferably once per second. More specifically, one embodiment may utilize a heartbeat message according to the specifications set out in STANAG 4586 Edition 3 at 4.13.5 covering Message #16002: Heartbeat Message. However, it is to be understood that other various forms of heartbeat messaging may be utilized to accomplish health monitoring tasks and indicate a negative or positive health. In another embodiment, communicating directly with the route control system 38 in the unmanned vehicle 11 may also be accomplished by way of the control system 24 simply receiving instructions from a user, or from a daemon being executed in the station processing system 20, directing the use of the second protocol even if the vehicle processing system 18 and heartbeat message are operating properly. The communication path and operation of the control station 14 and the unmanned vehicle 11 when implementing the use of the second protocol messaging may be more fully understood by referring now to FIG. 3.

Figure 3:
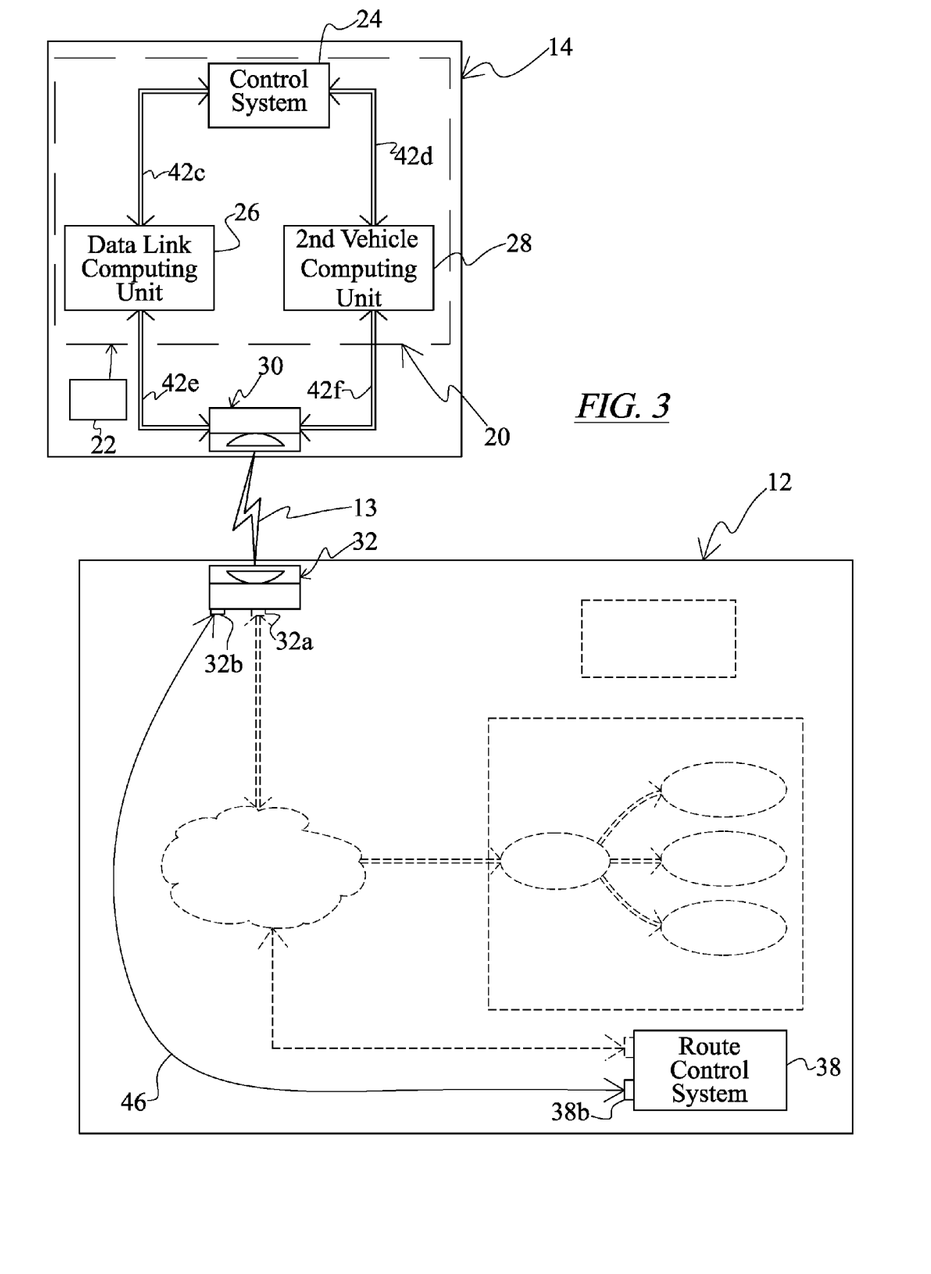
FIG. 3 is a detailed block diagram illustrating the elements and the operational flow within the control station and unmanned vehicle of FIG. 1 when operating in back-up mode whereby certain elements in the unmanned vehicle are bypassed, such bypassed elements being shown in ghost form for clarity, in accordance with the teachings of the present disclosure.

In FIG. 3, a detailed block diagram is shown illustrating the elements and the operational flow within the control station 14 and unmanned vehicle 11 of FIG. 1 when operating utilizing a second protocol and having certain elements bypassed during such operation in accordance with the teachings of the present disclosure. For clarity, such bypassed elements are shown in ghost form in FIG. 3. In one embodiment, when the heartbeat message is not received on time or when it indicates a negative health, the second vehicle computing unit 28 switches its mode of operation so as to no longer simply pass the STANAG 4586 protocol command and control messages received from the control system 24 through to the second data link 30. The second vehicle computing unit 28 now operates to convert the STANAG 4586 command and control messages received via DLI connection 42d from the control system 24 into the proprietary protocol required by the route control system 38 and to transmit such directly to the route control system 38 via serial port 32b of the first data link 32 and serial connection 46. In this manner, the vehicle processing system 18 in the unmanned vehicle 11 is completely bypassed, yet communication with the route control system 38 has not been lost.

In the meantime, while communication with the route control system 38 continues in this manner using the second protocol, the vehicle processing system 18 may be subjected to a battery of tests to troubleshoot the failure or initialize a reboot or otherwise undertake to investigate the condition of the vehicle processing system 18. To more fully understand and appreciate the series of actions that may be performed by the second vehicle computing unit 28, the first vehicle computing unit 34 and the route control system 38 during their operation to accomplish the teachings of the present disclosure, reference should made to FIGS. 4, 5 and 6. For clarity, their operation will be discussed one at a time. However, in one embodiment, it is to be understood that the series of actions undertaken by each are occurring contemporaneously in accordance with the teachings of the present disclosure.

Figure 4A:
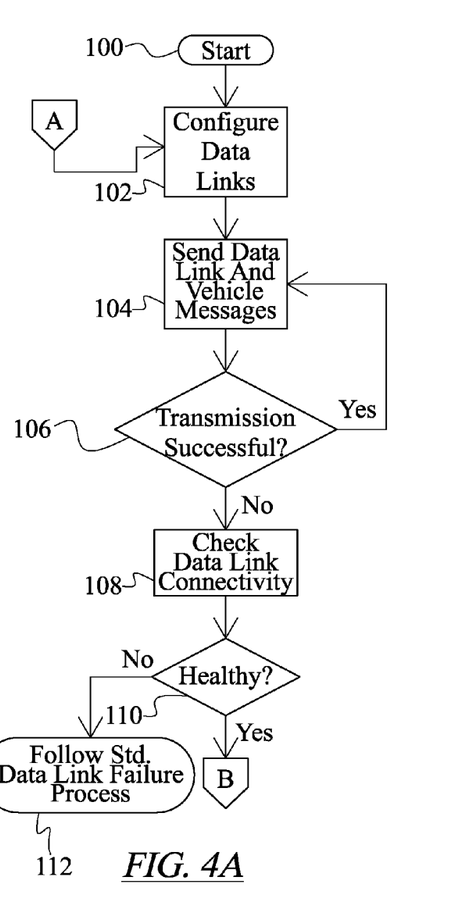
Figure 4B:
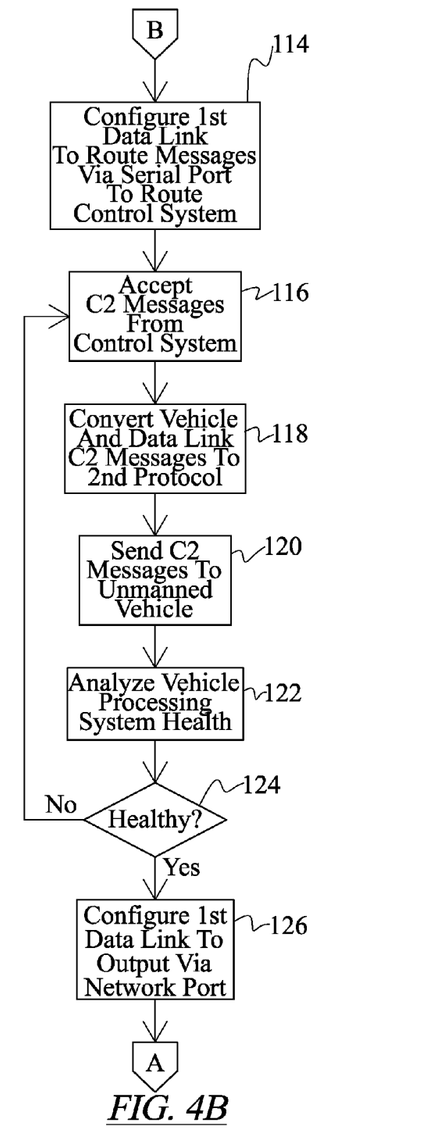

In referring now to FIG. 4, consisting of FIGS. 4A and 4B, flowcharts can be seen showing one embodiment of a series of actions that may be performed by the second vehicle computing unit 28 within the control station 14 of FIG. 1. The process of the second vehicle computing unit 28 is initiated in act 100. The process may be initiated by applying power to and performing any suitable bootstrapping operations to control station 14, station processing system 20 and second vehicle computing unit 28. In act 102, the second vehicle computing unit 28 may configure the second data link 30 and the first data link 32 for use in transmitting and receiving data link and vehicle messages to and from the unmanned vehicle 11. The data links 30 and 32 may be configured by initiating communication with second data link 30 and first data link 32 and receiving an appropriate protocol handshake as specifically defined by data links 30 and 32 respectively. In other embodiments, multiple data links may be configured such as, for example, any additional backup or secondary data links that may be available in the control station 14 or unmanned vehicle 11 may be configured as well and tested for operability.

In act 104, second vehicle computing unit 28 sends data link and vehicle messages using a first protocol. In one embodiment, the first protocol used may be the STANAG 4586 protocol. In other embodiments, the first protocol used may be the JAUS protocol or any other protocol deemed suitable for use in unmanned vehicle applications. In act 106, it is determined whether the transmission of the data link and vehicle messages was successful. This may be accomplished, for example, by way of receipt of a protocol handshake from the first data link 32 indicating that the messages were received intact. Other embodiments may make use of any number of other various techniques commonly used and/or generally known in the communications industry for confirming successful acceptance of data. If the determination in act 106 is that the transmission was successful, then the process moves back to act 104 and operates to continue to send messages in like manner. However, if the determination in act 106 is that transmission was not successful, then the process moves to act 108. In act 108, data link connectivity may be checked. In one embodiment, the connectivity of the second data link 30 and the first data link 32 may be checked to determine if either has been lost due to a failure or some other cause and, in doing so, also allowing for some reasonable time to pass so that any link obscurations may be taken into account as well. For example, the second and first data links, 30 and 32 respectively, may be checked by way of a heartbeat detection or running a typical bit resolve algorithm. In other embodiments, any number of various other troubleshooting techniques commonly used and/or generally known in the communications industry may be equally implemented for accomplishing the connectivity check.

In act 110, it is determined if the data links are healthy. If the data links are determined to be unhealthy, then the process moves to act 112 where the connectivity failure is investigated. In one embodiment, second data link 30 and first data link 32 are examined pursuant to established troubleshooting procedures commonly used and/or generally known in the communications industry for checking/verifying data link health. However, if it is determined that the data links are healthy, then the process moves to act 114 as shown in FIG. 4B.

In FIG. 4B, the process continues with the series of acts performed by the second computing unit 28 in accordance with the teachings of the present disclosure. In act 114, the first data link 32 may be configured to route messages via the serial port 32b to the route control system 38. In one embodiment, configuring the first data link 32 to route messages via the serial port 32b may be performed by the second vehicle computing unit 28 sending data link command and control messages via the second data link 30 to the first data link 32 instructing it to output vehicle command and control messages through the serial port 32b, as opposed to through the network port 32a, for communicating directly with the route control system 38 via serial connection 46. In other embodiments, other varying structures or configurations may be implemented to achieve the redirecting of vehicle command and control messages directly to the route control system 38. For example, additional output ports may be implemented on the first data link 32 or redundant secondary data links may be disposed on-board the unmanned vehicle 11 to accomplish the direct communication with the route control system 38.

In act 116, the second computing unit 28 starts accepting data link and vehicle command and control messages from the control system 24. In one embodiment, the second computing unit 28 may start accepting data link and vehicle command and control messages from the control system 24 sent using the STANAG 4586 protocol. In other embodiments, various other messaging protocols may be utilized by the control system 24 to send vehicle command and control messages like, for example, the JAUS protocol or any other protocol deemed suitable for use in unmanned vehicle applications. In act 118, the data link and vehicle command and control messages may be converted into a second protocol for subsequent transmission to the unmanned vehicle 11. In one embodiment, the converting of such messages into the second protocol may consist of converting the messages into the proprietary vehicle specific protocols required for communication directly with the first data link 32 and route control system 38. In act 120, the second vehicle computing unit 28 may send data link and vehicle command and control messages to the unmanned vehicle 11 in the second protocol by way of the second data link 30 to the first data link 32 in the vehicle specific protocols required for direct communication with the first data link 32 and the route control system 38. In act 122, the health of the vehicle processing system 18 may then be analyzed. In one embodiment, the health of vehicle processing system 18 may be analyzed by way of performing any number of commonly used and/or generally known troubleshooting algorithms for processing systems such as, for example, querying a check bit, a heartbeat test, or any other built-in test procedure for bit resolve.

In act 124, it is determined whether the vehicle processing system 18 is healthy. The results from act 122 are reviewed and, if the determination is that the vehicle processing system 18 is not healthy, then the process moves back to act 116 and continues in like manner. However, if it is determined that the vehicle processing system 18 is healthy, the process moves to act 126. In act 126, the first data link 32 may be configured to route messages via the network port 32a. In one embodiment, configuring the first data link 32 to route messages via the network port 32a may be performed by the second vehicle computing unit 28 sending data link command and control messages via the second data link 30 to the first data link 32 instructing it to output data link and vehicle command and control messages through the network port 32a for communicating via DLI connection 42a to the communication network 40 and to the vehicle processing system 18 for normal processing. From act 126, the process moves back to act 102 and continues in like manner.

Figure 5:
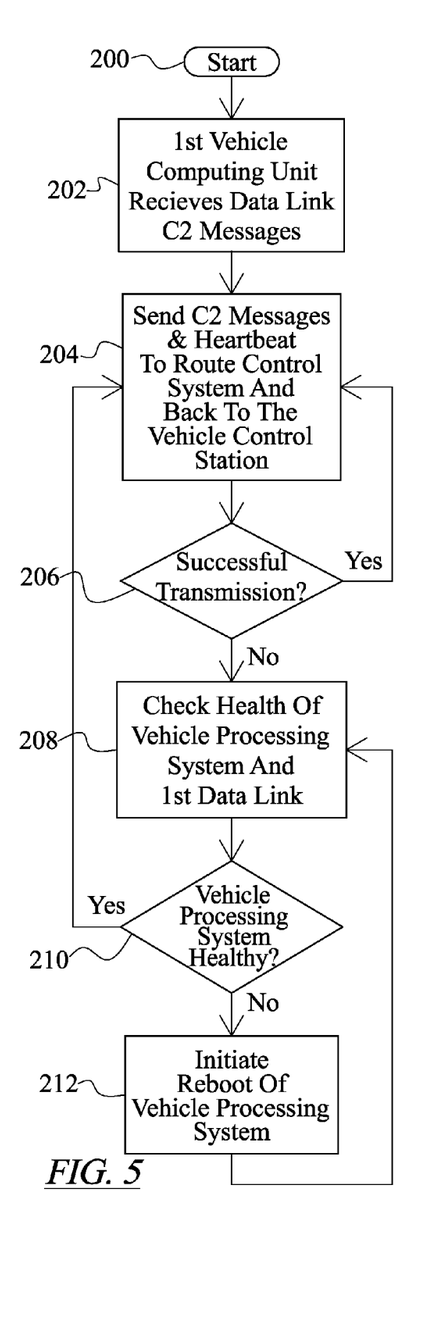
FIG. 5 is a flowchart showing a series of actions that may be performed by the first vehicle computing unit in an unmanned vehicle being remotely controlled by one embodiment of the control station of FIG. 1 in accordance with the teachings of the present disclosure.

In referring now to FIG. 5, a flowchart can be seen showing a series of actions that may be performed by the first vehicle computing unit 34 in an unmanned vehicle 11 being remotely controlled by one embodiment of the control station 14 of FIG. 1 in accordance with the teachings of the present disclosure. The process of the first vehicle computing unit 34 is initiated in act 200. In particular, the process may be initiated by applying power to and performing any suitable bootstrapping operations to the vehicle processing system 18 and the first vehicle computing unit 34 disposed on the unmanned vehicle 11. In act 202, the first vehicle computing unit 34 may receive data link command and control messages to configure the first data link 32. In one embodiment, the first vehicle computing unit 34 may receive data link command and control messages in the STANAG 4586 protocol from the first data link 32 via DLI connection 42a to the communication network 40 and, via DLI connection 42b, to the vehicle processing system 18 whereby the messages containing the configuration instructions are processed for transmission to first data link 32. In act 204, the first vehicle computing unit 34 may send received vehicle command and control messages and a heartbeat message to the route control system 38 as well as, at the same time, send the heartbeat message back to the control station 14. In one embodiment, such is accomplished by way of the first vehicle computing unit 34 sending a heartbeat message to the route control system 38 by way of the vehicle VSM 34d formatting the heartbeat message into the proprietary protocol suitable for communication to the route control system 38, and, at the same time, sending a heartbeat message back to the control station 14 by way of the vehicle VSM 34d also formatting the heartbeat message into the STANAG protocol and sending via the communication network 40 and first data link 32 to the second data link 30 for subsequent communication to and monitoring by either of the control system 24 or the second vehicle computing unit 28. In another embodiment, the heartbeat messages may be monitored by both the control system 24 and the second vehicle computing unit 28, or by any other suitable devices that may be deployed for monitoring system heartbeat signals that are commonly used and/or generally known in the communications industry.

In act 206, it is determined if transmission of the vehicle messages to the route control system 38 and heartbeat message to the control station 14 was successful. In one embodiment, this may be accomplished, for example, by way of receipt of a specific protocol handshake from the route control system 38 and the first data link 32 indicating that the messages were received intact. Other embodiments may make use of any number of other various indications commonly used and/or generally known in the communications industry for confirming successful acceptance of data. If the determination in act 206 is that the transmission was successful, then the process moves back to act 204 and operates to continue to send vehicle command and control messages and a heartbeat message in like manner. However, if it is determined that transmission was not successful, the process moves to act 208. In act 208, the first vehicle computing unit 34 may analyze the failure cause. In one embodiment, the failure cause may be analyzed by way of checking the vehicle processing system 18 by way of performing any number of commonly used and/or generally known troubleshooting algorithms for processing systems such as, for example, querying a check bit, a heartbeat test, or any other built-in test procedure for bit resolve, as well as checking the first data link 32 by way of, for example, looking for receipt of a specific protocol handshake, initiating a bit resolve algorithm or performing an examination pursuant to any other established troubleshooting procedures commonly used and/or generally known in the communications industry for checking/verifying data link health.

In act 210, it is determined whether vehicle processing system 18 is healthy. The results from act 208 are reviewed and, if the determination is that the vehicle processing system 18 is healthy, then the process moves back to act 204 and continues in like manner. However, if it is determined that the vehicle processing system 18 is not healthy, the process moves to act 212. In act 212, the vehicle computing unit 38 may initiate a reboot of the vehicle processing system 18. In one embodiment, initiating a reboot of the vehicle processing system 18 may be accomplished, for example, by the vehicle computing unit 34 sending instructions to the vehicle processing system 18 to perform a soft reboot. After rebooting the vehicle processing system 18, the process moves back to act 208 and continues in like manner.

Figure 6:
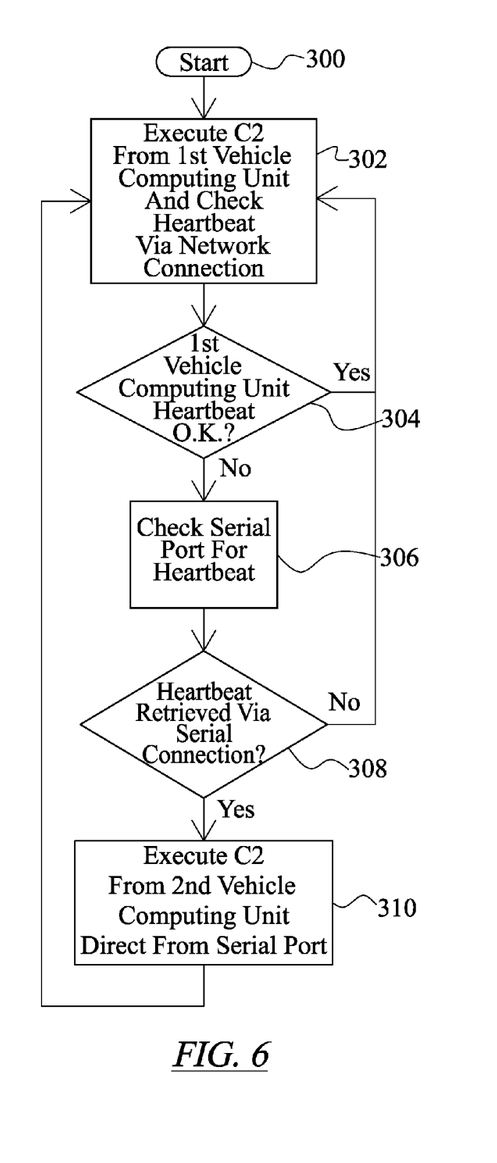
FIG. 6 is a flowchart showing a series of actions that may be performed by the route control system in an unmanned vehicle being remotely controlled by one embodiment of the control station with back-up VSM of FIG. 1.

In now referring to FIG. 6, a flowchart can be seen showing a series of actions that may be performed by the route control system 38 in an unmanned vehicle 11 being remotely controlled by one embodiment of the control station 14 of FIG. 1. The process of the route control system 38 is initiated in act 300. The process may be initiated by applying power to and performing any suitable bootstrapping operations to the route control system 38 disposed onboard the unmanned vehicle 11. In act 302, the route control system 38 may execute vehicle command and control messages from the first vehicle computing unit 34 and check for a heartbeat message. In one embodiment, such is accomplished by way of the route control system 38 executing vehicle command and control messages formatted in its proprietary protocol received via network connection 45 from the vehicle VSM 34d within the vehicle computing unit 34 as well as checking for a heartbeat message. In act 304, it is determined whether the heartbeat message from the first vehicle computing unit 38 is present and functioning properly. If the heartbeat message is present and functioning properly, the process moves back to act 302 and continues in like manner. However, if the heartbeat message is not present or functioning properly, the process moves to act 306. In act 306, the route control system 38 may check for the presence of a heartbeat message formatted in its proprietary protocol and functioning properly via serial connection 46. In act 308, a determination is made whether a heartbeat message is present and functioning properly via serial connection 46. If a heartbeat message formatted in the proprietary protocol of the route control system 38 is not present via serial connection 46, or is present but not functioning properly, then the process moves back to act 302 and continues in like manner. However, if the heartbeat message formatted in the proprietary protocol of the route control system 38 is present via serial connection 46 and functioning properly, then the process moves to act 310. In act 310, the route control system 38 may execute the vehicle command and control messages received via serial connection 46 and sent from the second vehicle computing unit 28 in the control station 14. Thereafter, the process moves back to act 302 and continues in like manner.

The present disclosure includes that contained in the appended claims, as well as that of the foregoing description. Although this disclosure has been described in its preferred form in terms of certain embodiments with a certain degree of particularity, alterations and permutations of these embodiments will be apparent to those skilled in the art. Accordingly, it is understood that the above descriptions of exemplary embodiments does not define or constrain this disclosure, and that the present disclosure of the preferred form has been made only by way of example and that numerous changes, substitutions, and alterations in the details of construction and the combination and arrangement of parts may be resorted to without departing from the spirit and scope of the invention.

What is claimed is:

1. A control station for remotely controlling an unmanned vehicle, the unmanned vehicle having a first data link, a vehicle processing system, a first vehicle computing unit and a route control system in communication with each other, the control station comprising:
    a control system operable to receive input for controlling the unmanned vehicle and forming corresponding data link messages and vehicle messages using a first protocol for subsequent transmission;
    a second vehicle computing unit in communication with said control system and operable to receive vehicle messages from said control system in said first protocol and subsequently transmit such messages using said first protocol and, when the vehicle processing system has a negative health, to transmit such messages using a second protocol suitable for communication with the route control system; and
    a second data link in communication with said control system and in communication with said second vehicle computing unit, said second data link operable to receive data link messages and vehicle messages from respective said control system and said second vehicle computing unit and to transmit and receive respective data link and vehicle messages to and from the first data link.

2. The control station of claim 1, wherein said second vehicle computing unit is further operable to transmit vehicle messages using said second protocol when directed to use said second protocol by said control system.

3. The control station of claim 1, wherein said second vehicle computing unit is further operable to monitor a heartbeat message from the unmanned vehicle and detect whether the vehicle processing system has said negative health.

4. The control station of claim 1, further comprising a data link computing unit in communication with said control system and said second data link and operable to receive data link messages from said control system and configure said second data link for communicating with the first data link.

5. The control station of claim 4, wherein said data link computing unit is in the form of a data link vehicle specific module (VSM) suitable for communicating with and configuring said second data link for transmitting and receiving messages to and from the first data link.

6. The control station of claim 1, wherein said control system comprises a Core Unmanned aerial vehicle Control System (CUCS) that communicates with said second vehicle computing unit and said second data link using a STANdardization Agreement (STANAG) 4586 messaging protocol.

7. The control station of claim 1, wherein said first protocol is a STANdardization Agreement (STANAG) 4586 protocol.

8. The control station of claim 1, wherein said first protocol is a Joint Architecture for Unmanned Systems (JAUS) protocol.

9. A control station for remotely controlling an unmanned vehicle, the unmanned vehicle having a first data link, a vehicle processing system, a first vehicle computing unit and a route control system in communication with each other, the control station comprising:
    a control system operable to receive input for controlling the unmanned vehicle and configured to form corresponding data link messages and vehicle messages having a STANdardization AGreement (STANAG) 4586 protocol for subsequent transmission and reception;
    a second vehicle computing unit in communication with said control system operable to receive vehicle messages from said control system having said STANAG 4586 protocol and transmit such messages to said second data link, and to transmit such messages using a second protocol suitable for communication with the route control system when directed to use said second protocol by said control system; and
    a second data link in communication with said control system and in communication with said second vehicle computing unit, said second data link operable to receive data link messages and vehicle messages from respective said control system and said second vehicle computing unit and to transmit and receive respective data link and vehicle messages to and from the first data link.

10. The control station of claim 9, wherein said second vehicle computing unit is further operable to transmit vehicle messages in said second protocol when the vehicle processing system has a negative health.

11. The control station of claim 10, wherein said second vehicle computing system is further operable to monitor a heartbeat message received from the first vehicle computing unit and determine whether the vehicle processing system has said negative health.

12. The control station of claim 9, further comprising a data link computing unit in communication with said control system and in communication with said second data link, said data link computing unit operable to receive data link messages from said control system and configure said second data link for communicating with the first data link.

13. The control station of claim 9, wherein said control system is in the form of a Core Unmanned aerial vehicle Control System (CUCS).

14. A method for controlling an unmanned vehicle using a control station, the unmanned vehicle having a first data link, a vehicle processing system, a first vehicle computing unit and a route control system in communication with each other, the method comprising:
    transmitting and receiving data link messages and vehicle messages to and from the unmanned vehicle using a first protocol for controlling the unmanned vehicle wherein the control station has a control system, a second vehicle computing unit and a second data link in communication with the vehicle;
    receiving a heartbeat message from the first vehicle computing unit; monitoring said heartbeat message to determine if said vehicle processing system has a negative health;
    transmitting said vehicle messages in a second protocol suitable for communicating with the route control system if the step of monitoring determines the vehicle processing system has said negative health.

15. The method of claim 14, wherein configuring said second vehicle computing unit to transmit said vehicle messages in a second protocol further comprises first transmitting instructions for the first data link to communicate said vehicle messages in said second protocol to the route control system.

16. The method of claim 15, wherein the first data link includes a serial port and wherein first transmitting instructions for the first data link to communicate said vehicle messages in said second protocol to the route control system comprises configuring the first data link to communicate through said serial port.

17. The method of claim 14, wherein said first protocol is the STANdardization Agreement (STANAG) 4586 protocol.

18. The method of claim 15, further comprising configuring said second vehicle computing unit to transmit said vehicle messages in said first protocol when the vehicle processing system has a positive health.

19. The method of claim 18, wherein configuring said second vehicle computing unit to transmit said vehicle messages in said first protocol when the vehicle processing system has a positive health further comprises first transmitting instructions for the first data link to communicate said vehicle messages in said first protocol to the first vehicle computing unit.

20. The method of claim 19, wherein the first data link includes a network port and wherein first transmitting instructions for the first data link to communicate said vehicle messages in said first protocol to the first vehicle computing unit comprises instructing the first data link to communicate through said network port.

* * * * *